INVENTOR
WILLIAM R. BACKER
BY Lewis M. Smith, Jr.
ATTORNEY

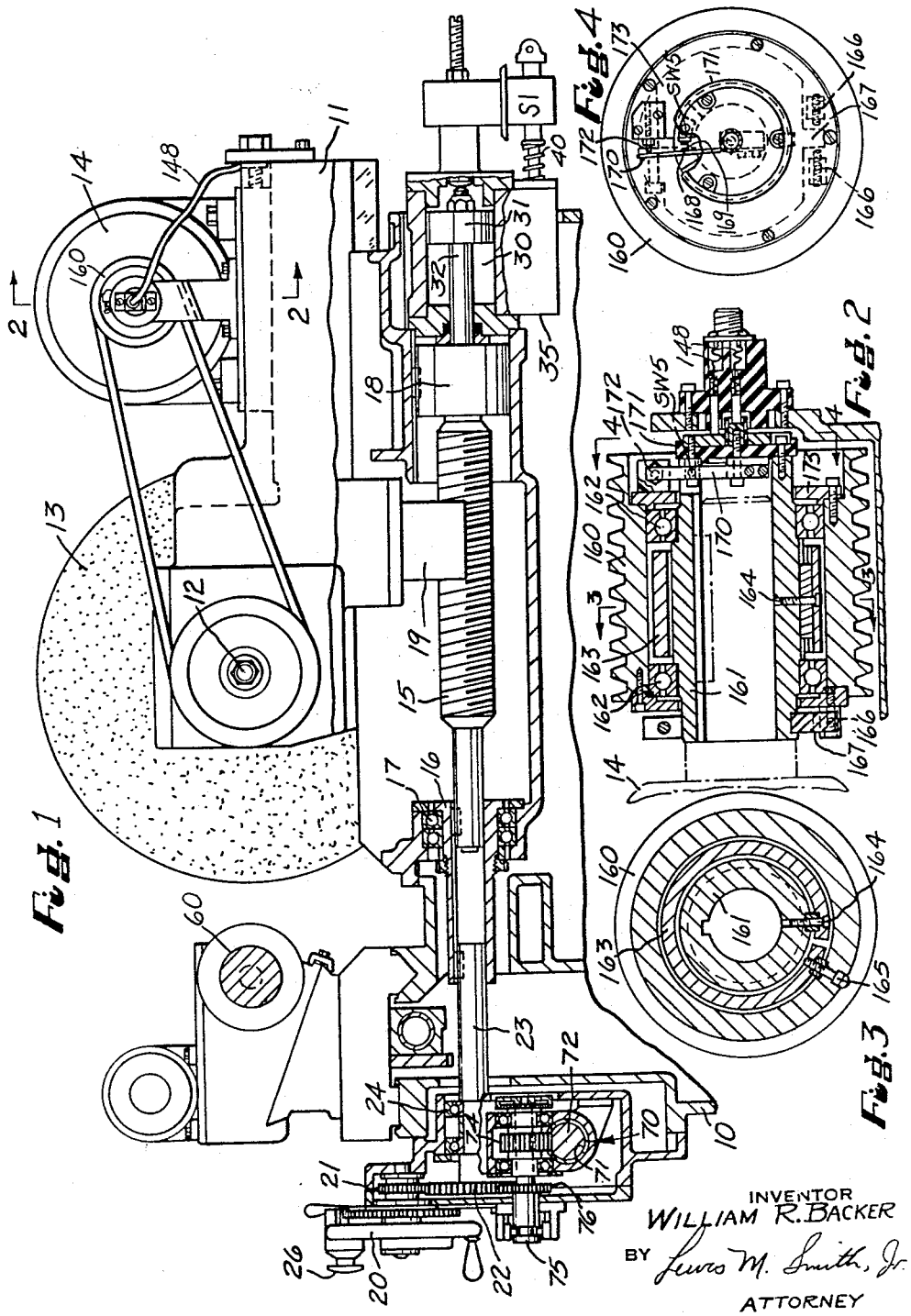

United States Patent Office 3,015,195
Patented Jan. 2, 1962

3,015,195
TORQUE RESPONSIVE CONTROL FOR A
DRIVEN MEANS
William R. Backer, Holden, Mass., assignor to Norton
Company, Worcester, Mass., a corporation of Massachusetts
Filed Feb. 18, 1960, Ser. No. 9,502
3 Claims. (Cl. 51—165)

This invention relates to grinding machines and more particularly to a grinding wheel feeding mechanism.

In the past various feeding arrangements have been proposed to speed up the infeed of a grinding wheel toward the work. Some systems move the wheel toward the work a given distance at a fast feed rate and then use a slow feed to complete the driving of the wheel forwardly until the finished work dimension is reached. In view of various tolerances allowed in the roughing out of the work such a feed arrangement requires that the fast feeding of the grinding wheel be stopped in advance of the largest diameter tolerated and thereafter the grinding wheel is put on a slow feed as it moves into contact with the work and on to the finished dimension. Thus as has been recognized in the past, time is consumed in "grinding air" as the grinding wheel is fed at the slow rate through the inevitable air gap resulting from this practice.

In Patent No. 2,758,426 to Comstock, August 14, 1956, there is shown a hydraulic motor and control means for feeding the grinding wheel slide toward the work in which a relatively fast wheel slide feed rate is continued until the grinding wheel actually contacts the work irrespective of the size of the work. After this initial contact is established, a pressure is built up in the hydraulic feed lines and control means are made sensitive to this condition to discontinue the relatively rapid feed and set in operation the desired feed rate to complete the grinding operation.

The present invention is an improvement following the Comstock teaching. It provides for a feed control means allowing a relatively rapid feed rate of the grinding wheel slide until the wheel contacts the work, but the present means operate in a different manner to control the change in feed rate to more promptly discontinue the relatively rapid feed and initiate the desired grinding feed. It is the purpose of this invention to provide a sensitive torque responsive means in the grinding wheel drive whereby to more rapidly sense the initial wheel and work contact. The torque responsive means can be conditioned to immediately terminate the relatively fast infeed of the slide and render the desired slower grinding feed operative.

Various means can be devised to accomplish the results of this invention. A preferred means is shown in the accompanying drawings wherein:

FIGURE 1 is an assembly view of a portion of a cylindrical grinding machine showing cooperative relation of the torque sensing means with the grinding wheel drive;

FIGURE 2 is a sectional view of the pulley sheave having the torque sensitive means therein taken on line 2—2 of FIG. 1;

FIGURE 3 is a sectional view taken on line 3—3 of FIGURE 2;

FIGURE 4 is a sectional view, partly broken away taken on line 4—4 of FIGURE 2.

Figure 5:
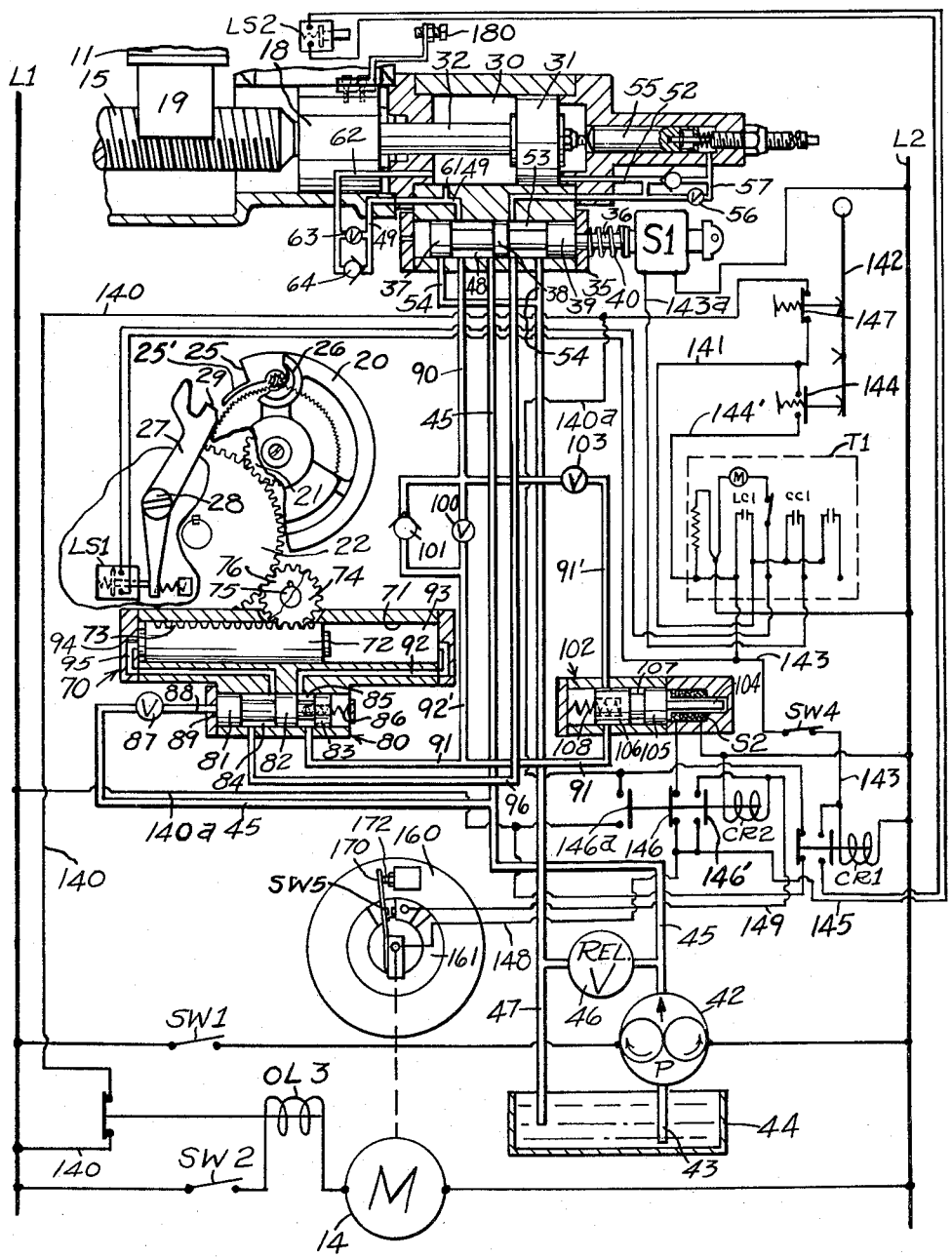
FIGURE 5 is a diagrammatic view of the hydraulic drive means and electrical control system of this invention.

As stated above the purpose of this invention is to accomplish the same result as is attained in the practice of the invention described in the Comstock Patent 2,758,-426 but by different means. The cylindrical grinding machine and grinding wheel slide controls shown in the present disclosure are basically the same as that shown in the patent to Silven and Flygare 2,522,485 dated September 12, 1950, to which reference may be made for details of disclosure not contained herein. This machine comprises a base 10 which serves as a support for a transversely movable wheel slide 11. The wheel slide 11 is supported on the usual V-way and flatway (not shown). The wheel slide 11 serves as a support for a rotatable wheel spindle 12 having a grinding wheel 13 mounted adjacent to one end thereof. The grinding wheel spindle 12 may be driven by any suitable source such as for example an electric motor 14 mounted on the wheel slide 11.

The wheel slide 11 is arranged to be fed transversely by a feeding mechanism comprising a rotatable feed screw 15 which is slidably keyed at its left hand end within a rotatable sleeve 16 which is supported by anti-friction bearing 17 carried by the base 10. The right hand end of the feed screw 15 is rotatably supported in a bearing (not shown) supported within a slidably mounted sleeve 18. The feed screw 15 meshes with or engages an axial movable feed nut 19 supported by a bracket depending from the underside of the wheel slide 11.

A manually operable feed wheel 20 is mounted on the front of the machine base 10. The feed wheel 20 is operatively connected to rotate a gear 21 which meshes with a gear 22. The gear 22 is supported on the forward end of a rotatable shaft 23. The shaft 23 is supported in anti-friction bearings 24 carried by the base 10. The right hand end of the shaft 23 is slidably keyed within the left hand end of the rotatable sleeve 16. It will be readily apparent from the foregoing disclosure that a rotary motion of the feed wheel 20 will be imparted through the mechanism above described to rotate the feed screw 15 so as to impart a transverse feeding movement to the wheel slide 11. The direction of rotation of the feed wheel 20 serves to determine the direction of movement of the wheel slide 11.

The feed wheel 20 is provided with a stop abutment 25, see FIGURE 5, which is adjustable relative to the feed wheel by means of a micrometer adjusting mechanism 26. A stop pawl 27 is pivotally supported by a stud 28 on the front of the machine base. The upper end of the pawl 27 is provided with a stop surface 29 so that when the pawl 27 is in an operative position, a rotary motion of the feed wheel 20 may be continued until the stop abutment 25 engages the stop surface 29 to positively limit the infeeding movement of the grinding wheel 13 and wheel slide 11.

In order to produce a rapid infeed and retraction movement of the grinding wheel 13 to and from an operative position adjacent the work, a hydraulically operated mechanism is provided. This mechanism comprises a cylinder 30 which is arranged in axial alignment with the sleeve 18 and feed screw 15. The cylinder 30 contains a slidably mounted piston 31 which is connected to the right hand end of a piston rod 32. The other end of the piston rod 32 is fixedly connected to the slidably mounted sleeve 18. The rapid movement of the wheel slide 11 caused by the piston 31 may continue until the piston 31 engages the left hand end of the cylinder 30.

A feed control valve 35 is provided for controlling the admission to and exhaust of fluid from the cylinder 30. The valve 35 is preferably a piston type valve comprising a valve stem 36 having a plurality of valve pistons 37, 38 and 39 formed integrally therewith. A compression spring 40 serves normally to maintain the valve stem 36 in its right hand end position. A solenoid S1 is operatively connected to the right hand end of the valve stem 36 and is arranged so that when energized, it serves to shift the valve stem 36 toward the left into a reverse position.

A suitable fluid pressure system is provided comprising a motor driven fluid pump 42 which draws fluid through a pipe 43 from a reservoir 44 and forces fluid under pressure through a pipe 45 to the feed control valve 35. A pressure relief valve 46 is connected to the pipe 45 by means of which fluid under excessive pressure may be bypassed directly through a pipe 47 into the reservoir 44 to facilitate maintaining a substantially uniform operating pressure in the hydraulic system.

In the position of the valve 35, as shown in FIGURE 5 fluid under pressure passing through the pipe 45 enters a valve chamber 48 located between the valve pistons 37 and 38 and passes through a passage 49 into cylinder 30 to move the piston 31 toward the right into a rearward or inoperative position. Movement of the piston 31 toward the right also imparts a corresponding axial movement to the feed screw 15, the nut 19, the wheel slide 11 so as to move the grinding wheel to a rearward or inoperative position. During this movement of the piston 31, fluid in cylinder 30 and behind piston 31 may exhaust through a passage 52, through a valve chamber 53 located between the valve pistons 38 and 39 and passes out through an exhaust pipe 54 into the reservoir 44.

In order to slow down the rapid rearward movement of the piston 31, a dash pot mechanism 55 is provided to facilitate slowing down and cushioning the rearward movement of the wheel slide at the end of its stroke. This dash pot mechanism is substantially the same as that shown in the prior U.S. patent to H. L. Swainey No. 2,582,610 dated January 15, 1952, to which reference may be had for details of disclosure not contained herein. A throttle valve 56 is provided in the pipe line 57 for controlling the exhaust of fluid from the dash pot mechanism 55 so as to regulate the rate of slow down or cushioning of the movement of the piston 31 as it moves toward the right.

It is similarly desirable to provide a cushioning or slowing down movement of the piston 31 as it moves rapidly toward the left as the grinding wheel approaches a workpiece 60 to be ground. During the initial rapid movement of the piston 31 toward the left, fluid may exhaust from the cylinder chamber 30 through a port 61, and valve 35 having moved to the left the fluid may pass thrrough the valve chamber 48 and out through the exhaust pipe 54 at a substantially unrestricted rate. When the piston 31 closes the port 61 just before the piston 31 reaches the left hand end of its stroke, fluid may then exhaust only through a passage 62, through a throttle valve 63 into the passage 49 and through the valve chamber 48 and exhausts through the pipe 54. By manipulation of the throttle valve 63, the rate of the cushioning movement of the piston 31 as it moves toward the left hand end of its stroke may be readily controlled as desired. A ball check valve 64 is connected between the passage 62 and the passage 49 which serves to facilitate a substantially unrestricted flow of fluid into the cylinder chamber 30 when the feed control valve 35 is shifted into the position shown in FIGURE 5 so as to start a rapid rearward movement of the piston 31 when the solenoid S1 is deenergized.

A suitable feeding mechanism is provided for producing a slow precise feeding movement of the grinding wheel 13 during the grinding operation. This mechanism is preferably a hydraulically operated mechanism in which a fluid motor 70 is provided for imparting a controlled rotary motion to the feed screw 15. The fluid motor 70 comprises a cylinder 71 which contains a slidably mounted piston 72. The upper surface of the piston 72 is provided with rack teeth 73 which mesh with a gear 74 carried by a shaft 75. The shaft 75 is also provided with a gear 76 which meshes with the gear 22. It will be readily apparent from the foregoing disclosure that when the piston 72 is moved endwise within the cylinder 71, a rotary motion will be imparted to the feed screw 15 through the rack and gear mechanism above described.

The same feeding mechanism including fluid motor 70 may be actuated to rotate feed screw 15 at a relatively faster rate to produce an intermediate feeding movement. For this purpose pipe 91 is also connected to solenoid valve 102, opened by energizing solenoid S2, and solenoid valve 102 is connected by pipe 91 through a second throttle valve 103 to pipe 90 so that throttle valve 100 may be by-passed. Since valve 103 is set to permit a more rapid flow of fluid than valve 100, the displacement to the left of valve stem 104 of solenoid valve 102 by energizing solenoid S2 initiates the intermediate feed. Solenoid S2 is energized when the normally open contacts of limit switch LS2 are closed by actuating means 180 shown mounted upon sleeve 18 for movement with piston 31 in cylinder 30 and adjusted to close switch LS2 as piston 31 reaches the left hand end of cylinder 30, terminating the fast feed.

A shuttle-type control valve 80 is provided for controlling the exhaust flow of fluid from the cylinder 71. The valve 80 includes a slidably mounted valve member having a plurality of spaced valve pistons 81, 82, and 83 forming a pair of spaced valve chambers 84 and 85. A compression spring 86 is provided normally to hold the valve member of valve 80 in a left hand end position during all phases of the automatic cycling of the machine, as shown in FIGURE 5.

In order to shift the valve 80 toward the right to permit hand feeding of the grinding wheel under certain conditions, the pipe 45 is connected through manually operated valve 87 and a pipe 88 with a left hand end chamber 89 in the valve 80 and when the valve 87 is opened fluid under pressure is admitted into the end chamber 89 and passages 91 and 96 connected to valve body 80 are cut off by pistons 82 and 81 respectively. When the valve moves to the right, a suitable clutch is operated to disengage shaft 75 from gear 76 and hand wheel 20 may be turned to move the grinding wheel slide as desired and hydraulic fluid under pressure is not delivered to either end of the motor 70 until the valve 87 is closed to cut off the fluid pressure supply to chamber 89 and vent the chamber so the piston in valve 80 can return to the left hand position.

In the position of the control valves 35 and 80 of FIGURE 5, the system is set up for automatic control and fluid under pressure entering the valve chamber 48 may pass through a pipe 90, through a throttle valve 100, through a ball check valve 101, and pipes 92' and 91 to flow into the valve chamber 85 in the valve 80, and onwardly through a passage 92 into the right hand end of the cylinder 71 to move the piston 72 toward the left into the position illustrated in FIGURE 5. The left hand movement of the piston 72 serves to impart a rotary motion to the feed screw 15 to cause a rearward axial movement of the nut 19 which assists in carrying the wheel slide 11 and the grinding wheel 13 to the retracted position. During this movement of the piston 72, fluid within a cylinder chamber 94 may exhaust through a passage 95, through the valve chamber 84, through a pipe 96, into the valve chamber 53 and exhaust therefrom through exhaust pipe 54, pipe 47 and into the reservoir 44. It will be readily apparent from the foregoing disclosure that the feed control valve 35 is arranged to control the admission to and exhaust of fluid from the rapid feed cylinder 30 and the slow grinding feed cylinder 70.

During normal automatic feeding of the grinding wheel slide, when solenoid S1 is energized to move valve 35 to the left, pressure fluid is fed from line 45 into valve chamber 53 and into passages 52 and 96. In order to obtain the maximum efficiency of the grinding machine, it is desirable to feed the grinding wheel in as rapidly as possible until it moves into operative engagement with the work piece 60 to be ground. As illustrated and described the above movement of the piston 31 toward the left causes a rapid approaching movement of the grinding wheel which continues at a rapid rate until the piston engages the left hand end of the cylinder 30. During this movement of the piston 31 toward the left, fluid under pressure is passed through the pipe 96 into the left hand end of the cylinder 71 to start the piston 72 moving toward the right and the exhaust fluid from cylinder 71 flows through passage 92 and valve 80 into passage 91 and depending upon the setting of valve 102 the fluid flows to the reservoir 44 either through line 91' as governed by the throttle valve 103 or through line 92' as governed by throttle valve 100.

Since valve 102 remains closed until the contacts of switch LS1 are closed when the piston 31 reaches the left hand end of cylinder 30 to terminate the fast infeed, the displacement of piston 72 in cylinder 71 accompanying the movement of piston 31 is at the slow grinding feed rate. Actually, the grinding feed rate is so much slower than the fast feed rate that the grinding feed concurrent with the fast feed is primarily effective to take up slack in the feed mechanism. When piston 31 bottoms at the left hand end of cylinder 30, switch LS2 is closed to energize solenoid S2, so that valve 102 is opened to pass fluid through pipe 91' and throttle valve 103 to actuate piston 72 so as to produce an intermediate forward movement of the wheel slide 11 and grinding wheel 13 under the control of throttle valve 103 at a faster rate than the normal slow grinding infeed, until the grinding wheel 13 moves into operative grinding engagement with the workpiece 60, thereby actuating a torque responsive means to close valve 102. When valve 102 is closed again, throttle valve 100, being more restricted, slows the piston 72 down to the desired grinding infeed speed for the remainder of the automatic feeding cycle.

The solenoid valve 102 is a piston type valve comprising a valve stem 104 having a pair of spaced valve pistons 105 and 106 which form a valve chamber 107. A compression spring 108 serves normally to exert a pressure tending to move the valve stem 104 toward the right into a closed position. The solenoid S2, which is energized when switch LS2 is closed at the end of the fast infeed to initiate the intermediate infeed serves to hold the valve 102 at the left end of the valve and opposite to the position illustrated in FIGURE 5 so that fluid may pass unrestricted through the valve chamber 107 and throttle valve 103 controls the rate of flow. When solenoid S2 is deenergized by the torque responsive means described in detail below, the valve stem 104 returns to the closed position shown in FIG. 5.

The electrical system for operating the control valves to obtain the desired sequence of feeding and retracting movements is energized by throwing switch 142, FIGURE 5, which momentarily engages contacts 144 and and current then flows from L1 through line 140 across contacts 147 across contacts 144 to line 144' to close the contacts LC1 and CC1 and establish a holding circuit therefor in the adjustable timer T1 which will be referred to hereinafter. The current also flows across contacts CC1 through line 143a and solenoid S1 to line L2, to energize solenoid S1 to move valve stem 36 of feed control valve 35 to the left against the biasing effect of spring 40, and thereby initiate displacement of the piston 31 to the left in cylinder 30 to produce the fast infeed, and concurrent displacement of the piston 72 to the right in cylinder 71 at the rate which produces the grinding infeed. If the switch SW4 is open, control relay CR1 is not energized and the normally closed contacts of control relay CR1 remain closed, so that the control system illustrated will provide an automatic feeding cycle controlled by timer T1 including a fast infeed followed directly by a grinding infeed, without introducing an intermediate infeed terminated by operation of the torque responsive means disclosed herein. On the other hand, if switch SW4 is closed, the control system illustrated will function in the manner described in detail below to provide an automatic feeding cycle including a fast infeed, an intermediate infeed, and a grinding infeed.

With switch SW4 closed, when contacts LC1 are closed current bypasses contact 144 and flows from line 140 across contacts 147 to line 141 across contacts LC1 and then not only across contacts CC1 to line 143a and solenoid S1 but also to line 143 and across switch SW4 to energize control relay CR1. The normally open contacts of control relay CR1 are closed when it becomes energized and current flows from line 143 across these contacts to line 145, through the normally open contacts of switch LS2 after these contacts have been closed when piston 31 bottoms, across the normally closed contacts 146 of control relay CR2 to energize solenoid S2 of valve 102 to hold the valve to the left and in a position opposite to the position shown in FIGURE 5. In this position fluid may flow from the right hand end of cylinder 71 through conduit 91 across chamber 107 of valve 102 into conduit 91' through throttle valve 103 to conduits 90, 54 and 47 to establish the conditions which produce the controlled intermediate infeed immediately after the initial fast infeed stroke has been completed by the bottoming of piston 31 at the left hand end of cylinder 30. The intermediate relatively fast infeed speed is controlled by the setting of valve 103 and the intermediate feed is continued until the grinding wheel engages the work, thereafter the relatively slow precise infeed suitable for grinding is reestablished at the desired rate. The grinding feed is once again set in motion when the solenoid S2 is deenergized to return the valve 102 to the closed position shown in FIGURE 5. When the valve occupies this position, the fluid being exhausted from the right hand side of cylinder 71, as piston 72 is driven forwardly, is pushed into conduit 91 and, now being blocked from passing through valve 102, passes through conduit 92' to flow through throttle valve 100 which may be set to control the slow grinding infeed as desired. The exhaust fluid from throttle valve 100 flows through conduit 90 to chamber 48 to conduit 54 which connects with the reservoir 44 through conduit 47.

After the grinding cycle has started, the grinding wheel moves forwardly at the summation of the fast and grinding feed rates until the piston 31 bottoms at the left hand end of the cylinder 30 actuating switch LS2 and thereafter at the intermediate feed rate until the valve 102 is moved from the left end of the valve to the position shown in FIGURE 5, which movement takes place when the torque responsive means, hereinafter described, is made to function by engagement of the grinding wheel 13 with workpiece 60. Referring to FIGURE 5 this torque responsive means includes the normally open contacts SW5 which are held open all of that portion of the grinding cycle when the grinding wheel is grinding air. As soon as the grinding wheel contacts the work, however, contacts SW5 are closed and current flows from line L1 through relay CR1, line 145, and line 148 and thence through contacts SW5 to line 149. The current flows through line 149 to energize relay CR2. When this relay is energized contacts 146 are opened and contacts 146' and 146a are closed.

The opening of contacts 146 deenergizes solenoid S2 and the compression spring moves valve 102 to the position shown in FIGURE 5. The making of contacts 146' establishes a holding circuit to keep relay CR2 energized even though switch SW5 might accidentally or otherwise be opened before the end of the grinding cycle. The holding circuit is completed upon the closing of contacts 146' when current flows from line 143 across the set of contacts closed when relay CR1 is energized, through line 145, across contacts 146', to hold relay CR2 energized. As long as relay CR2 is energized solenoid S2 remains deenergized and the hydraulic circuit is conditioned such that slow grinding infeed continues at a rate as determined by the setting of throttle valve 100.

The device described will operate satisfactorily with line 140 connected directly to line L1. However, if the contacts of switch SW5 fail to close or if the circuit controlled by SW5 does not function properly for any reason, serious damage to the machine or to the workpiece might result before a conventional overload switch associated with drive motor 14 would respond to a load in excess of the maximum motor load. Therefore, line 140 is preferably connected to line L1 through an overload switch OL3 inductively coupled to the power supply circuit of motor 14 and set to open its normally closed contacts at about fifty percent of the normal load on motor 14. When these contacts open the solenoid S1 is deenergized and the feed is reversed automatically to withdraw the grinding wheel from the workpiece, unless normally open contacts 146a of solenoid CR2 connected in parallel with overload switch OL3 have been closed. If the torque responsive means described below, including switch SW5, is included in the control system by closing switch SW4 and the circuit controlled by switch SW5 functions normally when the grinding wheel engages the workpiece, the contacts of switch SW5 will close immediately, energizing relay CR2 to close contacts 146a before the load on motor 14 reaches the level at which the normally closed contacts of overload switch OL3 open. Accordingly, overload switch OL3 never interrupts the automatic feeding cycle as long as the torque responsive means functions first. If switch SW4 is open the normally closed contacts of relay CR1 bypass overload switch OL3.

When the grinding cycle has been completed either with or without an intermediate feed controlled by the torque responsive means the timer T1 is operative in a well known manner to break the holding circuit through contacts LC1 thereby deenergizing relay CR1 and solenoid S1 to shift valve 35 to the position shown in FIGURE 5 to effect a fast return of the grinding wheel slide to its fully retracted position. When relay CR1 is deenergized its contacts are opened and relay CR2 becomes deenergized so that its contacts are then reset for the next succeeding grinding cycle. Valve 102 remains in the position shown in FIGURE 5 until after the next feeding cycle is started because the circuits from lines 143 and 148 are opened and switch LS2 is open. During the fast return, pressure fluid is delivered to the left hand side of cylinder 30 and the exhaust fluid flows from the right hand end of cylinder 30 through passage 52, chamber 53 to conduit 54 which connects to the reservoir 44 through conduit 47. Simultaneously pressure fluid is fed to the right hand end of cylinder 71 and exhaust fluid flows from the left hand end of cylinder 71 through passage 95, chamber 84 to conduit 96 to chamber 53 and conduit 54.

To render the controls operative as above described suitable electrical wiring, rotating slip ring contactors on the grinding wheel drive, switches and motors are provided, the entire system being designed to be automatically responsive to the initial closing of switch SW5 of the torque responsive means. Switch SW5 includes a pair of contacts adapted to be operated by a relatively minute movement and it is associated with the means responsive to a predetermined variation in the torque in the drive line to the grinding wheel. Preferably the torque responsive means and switch SW5 are situated as close to the grinding wheel as possible and as shown in FIGURES 2 and 4 are mounted on the pulley sheave associated with the grinding wheel drive motor on the grinding wheel slide. It will be obvious that the torque responsive means could also be built into the pulley sheave associated with the grinding wheel or even in the wheel or in the motor itself.

As illustrated here in FIGURES 1, 2, 3 and 4 the torque responsive means is built into the sheave 160 which is adapted to be driven by the motor, the sheave being relatively rotatably carried on a bearing mounting 161 that is keyed to the drive shaft of the motor. Suitable ball bearing means 162 support the sheave on the mounting. The sheave 160 is drivingly connected to the bearing mounting 161 by a C shaped spring 163 one end of which is bolted to the mounting 161 by bolts 164, the other end being bolted to the sheave 160 by bolts 165. Suitable spacers may be provided to hold the ends of spring 163 centralized in the space provided between the mounting and the sheave. The spring 163 is selected to have a strength to hold the sheave and drive shaft in the operative relation shown in FIGURE 3 as the grinding wheel is cutting air. However, when the wheel engages the work more driving force is required and the drive shaft continues to turn while the wheel drags against the work so that there is a tendency for the sheave to rotate relative to the drive shaft. When this happens the spring 163 tends to wind up and it is designed to have such resilience as will permit such relative rotation between the drive shaft and sheave to take place only when the wheel is in contact with the work. The extent of such movement is controlled by the adjustable stops 166 carried on one end of the sheave that are adapted to engage a tongue 167 adjustably clamped integral to the mounting 161.

At the opposite end of the sheave 160 a pair of electrical contacts 168 and 169 are mounted which form switch SW5. Contact 168 is carried on a spring arm 170 which is supported on an insulating block 171 bolted to the end of the bearing mounting 161 keyed to the drive shaft. Contact 169 is carried on insulating pad 171 in a position to meet contact 168 when spring arm 170 is released. Normally contact 168 is held out of engagement with contact 169 but the two contacts are positioned to come together when the grinding wheel engages the work and spring 163 is stressed to permit relative rotation to take place between the sheave and drive shaft. A suitable adjustable stop 172 is mounted on plate 173 that is bolted to the end of sheave 160, the stop being adapted to engage the extension of spring arm 170 to normally hold the contact 168 away from contact 169 when the grinding wheel is being driven to grind air. As soon as the grinding wheel contacts the work, more torque is required to drive the grinding wheel and if the drive shaft and sheave 160 are being driven to rotate in a counterclockwise direction referring to FIGURE 4, the sheave 160 will rotate in a relative clockwise direction with respect to drive means 161 when this added torque is delivered to the drive means. Thus stop 172 is retracted from behind spring arm 170 and contacts 168 and 169 are brought together when the required torque is added to the drive system as soon as the grinding wheel contacts the work. The closing of switch SW5 is utilized as explained above to control the operation of the valve 102 to cut off the relatively fast air grinding intermediate infeed and set up the conditions for driving the grinding wheel slide forwardly toward the work at the desired slow precise grinding feed rate.

An automatic control mechanism is provided for automatically controlling the duration of the grinding cycle comprising an electric timer which is preferably the automatic re-set type adjustable timer T1, mentioned above which may be for example the Microflex timer manufactured by the Signal Electric Corporation of Moline, Illinois. When it is desired to start a grinding cycle, the lever 142 is rocked in a clockwise direction to close the start switch 144 which serves to condition the timer for operation by closing contacts LC1 as above explained, and which also causes contacts CC1 to close. The closing of the contacts CC1 serves to energize the solenoid S1 to shift the feed control valve 35 to the left so as to admit fluid under pressure to the cylinder chamber 30 to cause a rapid approaching movement of the piston 31, the wheel slide 11, and the grinding wheel 13. At the same time the feed control valve 35 passes fluid under pressure to start movement of feed piston 72 toward the right to start a rotary motion of said screw. The grinding operation proceeds in a manner above described and the changes in the feeding cycle are brought about as described above. The timer motor, however, is not started until that point in the grinding feed when the limit switch LS1 is closed by the rocking of the pawl 27 by a cam 25' ahead of the stop abutment 25. When the desired grinding cycle has been completed the timer T1 times out at which time the solenoid S1 is deenergized to shift the feed control valve 35 into the position shown in FIGURE 5 to cause the wheel slide 11 and grinding wheel 13 to move to a rearward or inoperative position. At any time during the grinding cycle, the grinding feed may be stopped if necessary by shifting the lever 142 in a counter-clockwise direction to open the stop switch 147 thereby deenergizing the timer and at the same time deenergizing the solenoid S1 to cause a rearward movement of the wheel slide 11 to an inoperative position.

The operation of this improved feeding mechanism will be readily apparent from the foregoing disclosure. Assuming all of the adjustments have been previously made, switch SW4 is closed and a workpiece 60 is positioned in the machine, after which the control lever 142 is rocked in a clockwise direction in FIGURE 5 to start a grinding cycle. The timer T1, relay CR1, and solenoid S2 are energized. When solenoid S1 is energized it shifts the control valve 35 which causes the piston 31 to start moving rapidly toward the left and the feed piston 72 to move toward the right. The rapid approaching movement produced by the fast feed motion of piston 31 continues until the piston 31 engages the left hand end of the cylinder 30. The piston 72, however, concurrently moves toward the right at a rate governed by the throttle valve 100 which causes the wheel slide to feed in at the grinding feed rate until the limit switch LS2 is closed to energize solenoid S2 and thereby admit fluid through solenoid valve 102 to throttle valve 103 to move piston 72 to the right at the relatively faster intermediate feed rate. When the grinding wheel 13 engages the workpiece 60, switch SW5 is actuated in a manner above described to deenergize the solenoid S2 thereby cutting off exhaust of fluid from cylinder chamber 93 through the throttle valve 103 and forcing the fluid to exhaust through throttle valve 100 which is set to produce the desired rate of infeed for the grinding operation. At a predetermined point before the work is ground to size, limit switch LS1 is closed, starting the timing motor of the timer T1. After completion of a predetermined grinding operation, the timer T1 times-out, thereby deenergizing relay CR1 and the solenoid S1 so that the wheel slide 11 and grinding wheel 13 move rearwardly to an inoperative position. It will be readily apparent from the foregoing disclosure that by utilizing this invention the grinding wheel may be fed inwardly while grinding air at a fairly rapid rate until it engages the work after which the rate of feed is reduced to the desired and predetermined grinding feed rate thereby increasing the efficiency of the machine by reducing the time in which the grinding wheel so-called grinds air.

This invention provides an apparatus in which the various objects hereinabove set forth, together with many thoroughly practical advantages, are successfully achieved.

Since many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim:

1. A drive system having drive means operable at a variable load level up to a predetermined maximum load, a first driven means, and torque responsive means for interconnecting said drive means and said first driven means, said system including at least one rotatable member, said rotatable member including at least two relatively movable parts, biasing means tending to hold said parts in a first relative position when the torque developed in the rotatable member of the system is of a relatively low value within a predetermined limit at a first relatively lower intermediate load level but being yieldable to accommodate relative movement of said parts to a second relative position when the torque developed attains a higher value above the predetermined limit, a second reversible driven means, and control means responsive to the initial change from the first relative position to the second relative position of said parts to establish a modified operation of a second driven means in the same direction, reversing means actuated at a second relatively higher intermediate load level and operable to reverse the direction of operation of said second driven means, and connecting means operable to bypass said reversing means actuated by operation of said control means.

2. A powered driving system having at least first and second coordinated driven components therein, said second driven component being operable in opposite directions, at least said first component including a rotatable member, and the operation of said second component being modified from a first operating condition to a second operating condition in response to a predetermined change in the driving torque applied to the rotatable member in said first component, said rotatable member in said first component including at least two relatively movable parts, means tending to hold said parts in a first relative position when the torque applied to said rotatable member in the first component is of relatively low value but being arranged to allow relative movement of said parts to a second relative position when the torque applied to said rotatable member attains a predetermined higher value, and control means responsive to the initial change in the relative position of said parts dependent upon the application of a driving torque in excess of a predetermined value to change the operation of said second driven component in a given direction from a first condition to a second condition, and drive means, operatively connected to said first driven component, operable at a variable load level up to a predetermined maximum load including a first relatively lower intermediate load level coresponding to said predetermined value of the driving torque and a second relatively higher intermediate load level below said maximum load, reversing means for said second driven component actuated at said second relatively higher intermediate load level and operable to reverse the direction of operation of said second driven component, and connecting means operable to bypass said reversing means actuated concurrent with normal operation of said control means.

3. An automatically operable standby reversing means for retracting a reversible driven element normally operated in one direction under a succession of different operating conditions sequentially initiated by a control means therefore, said reversing means including sensng means iresponsve to a predetermined intermediate load level on a driving means operable at a variable load level up to a predetermined maximum load, actuating means controlled by said sensing means operable to initiate retraction of a driven element, and means operable at a relatively lower predetermined intermediate load level to bypass said actuating means and actuated by normal operaton of the control means for a reversible driven element.

References Cited in the file of this patent

UNITED STATES PATENTS

| | | |
|---|---|---|
| 2,168,596 | Hall | Aug. 8, 1939 |
| 2,348,090 | Otto | May 2, 1944 |
| 2,758,426 | Comstock | Aug. 14, 1956 |
| 2,825,776 | Curtis | Mar. 4, 1958 |

FOREIGN PATENTS

| | | |
|---|---|---|
| 363,544 | Great Britain | Dec. 24, 1931 |
| 782,432 | Muller | Sept. 4, 1957 |

UNITED STATES PATENT OFFICE
CERTIFICATE OF CORRECTION

Patent No. 3,015,195            January 2, 1962

William R. Backer

It is hereby certified that error appears in the above numbered patent requiring correction and that the said Letters Patent should read as corrected below.

Column 1, line 57, for "sensing" read -- sensitive --; column 3, line 57, for "thrrough" read -- through --; column 10, line 55, for "coresponding" read -- corresponding --; line 69, for "sensng" read -- sensing --; line 70, for "iresponsve" read -- responsive --; column 11, line 1, for "operaton" read -- operation --.

Signed and sealed this 8th day of October 1963.

(SEAL)
Attest:

ERNEST W. SWIDER
Attesting Officer

EDWIN L. REYNOLDS
Acting Commissioner of Patents